Nov. 8, 1949    D. L. MILLER    2,487,579
ENGINE STARTER DRIVE
Filed Jan. 19, 1948

INVENTOR.
Donald L. Miller
BY
Clinton S. James
ATTORNEY

WITNESS:
Esther M. Stockton

Patented Nov. 8, 1949

2,487,579

UNITED STATES PATENT OFFICE 2,487,579

ENGINE STARTER DRIVE

Donald L. Miller, Pine City, N. Y., assignor to Bendix Aviation Corporation, a corporation of Delaware Application January 19, 1948, Serial No. 3,100

4 Claims. (Cl. 74—7)

1

The present invention relates to an engine starter drive, and more particularly to a heavy duty type of drive incorporating a load limiting feature.

It is an object of the present invention to provide a novel starter drive incorporating a coupling which is arranged to yield and slip or ratchet when the drive is subjected to a predetermined overload.

It is another object to provide such a device in which the coupling is lightly loaded when the drive is idle, the coupling being compressed to increase its torque capacity in response to the application of the load thereon.

It is another object to provide such a device in which the transmission of torque by the coupling is mainly brought about by the rotary component of the pressure on surfaces inclined to the axis of the drive, whereby the effect of friction between the engaging surfaces of the coupling is not the dominant factor in the torque capacity of the coupling.

It is another object to provide such a device in which the compression of the coupling members is positively limited so as to correspondingly limit the maximum torque capacity of the coupling.

It is another object to provide such a device in which the coupling members are in the form of discs or rings having inclined teeth which are yieldingly pressed together by springs so that they can ride over each other when the drive is overloaded.

It is another object to provide such a device incorporating novel means for cushioning the impact of the engagement of the gearing and to prevent jamming or milling of the gear teeth in the case the teeth of the pinion should abut against the teeth of the engine ring gear.

Further objects and advantages will be apparent from the following description taken in connection with the accompanying drawing in which.

Figure 1:
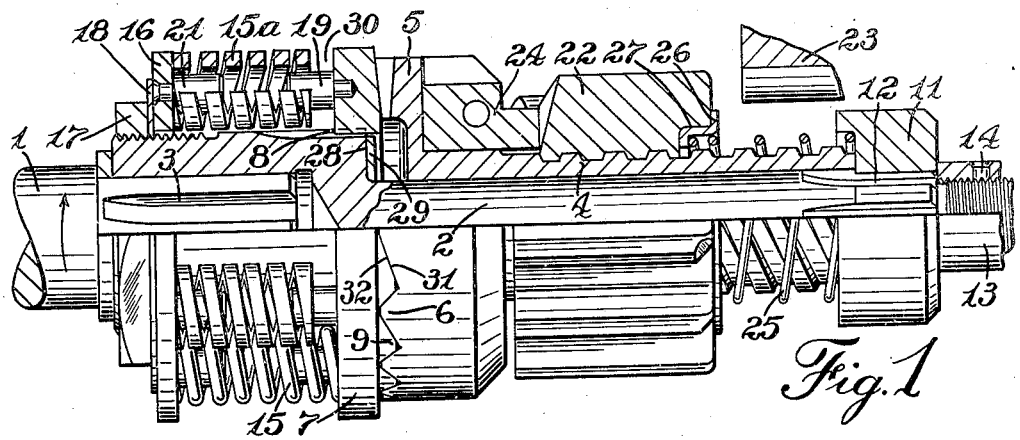
Fig. 1 is a side elevation partly broken away and in section of a preferred embodiment of the invention, the parts being shown in idle position.

In Fig. 1 of the drawing there is illustrated a motor shaft 1 which may be the armature shaft of a starting motor not illustrated and on which

2 an extension in the form of a power shaft 2 is rigidly fixed as by means of the splined connection indicated at 3. A screw shaft 4 is slidably journalled on a smooth reduced portion of the power shaft 2 and is formed with an enlarged disc or flange portion 5 which is provided with inclined teeth 6. A driving coupling member in the form of a ring 7 is splined on the power shaft 2 as indicated at 8, and is provided with inclined teeth 9 adapted to cooperate with the teeth 6 of the driven coupling member 5 and transmit rotation from the power shaft 2 to the screw shaft 4 when the coupling members are pressed together.

The screw shaft 4 is confined on the power shaft 2 by means of an abutment member 11 which is rigidly fixed to the power shaft 2 by suitable means such as a splined connection indicated at 12, and a nut 13, which latter is preferably pinned to the power shaft as shown at 14.

Means are provided for normally holding the screw shaft 4 against the abutment 11, and for pressing the coupling members 7, 5 together with a comparatively light pressure. As best shown in Fig. 1, this means comprises a series of relatively light compression springs 15, bearing at one end against the driving coupling member 7 and at the other end against a thrust plate 16 which is adjustably located on the power shaft 2 by means of a nut 17 and washer 18. Stub shafts 19 and 21 are preferably fixed to the driving coupling member 7 and plate 16 respectively to act as pilots for the ends of the springs 15 so as to keep them properly alined and spaced.

A pinion 22 is threaded on the screw shaft 4 for longitudinal movement into and out of engagement with a member such as a ring gear 23 of an engine to be started, the meshing position of the pinion being defined by the abutment 11 on the power shaft 2, and the idle position of the pinion being defined by a backstop 24 suitably fixed on the screw shaft in position to engage a shoulder formed on the pinion.

The pinion 22 is normally maintained in idle position by means of an anti-drift spring 25 located between the abutment 11 and the pinion, a thimble 26 being preferably inserted in a counterbore 27 in the front end of the pinion to receive the end of the spring, and to act as a washer between the pinion and abutment member.

Longitudinal movement of the screw shaft 4 in the direction away from the engine ring gear 23, caused by the screw-jack action of the screw shaft and pinion after the pinion engages the abutment 11, is limited by a shoulder 28 on the power shaft 2. A washer 29, preferably formed of a self-lubricating material such as an oil impregnated bearing metal, is mounted on the power shaft between the shoulder 28 and the end of the screw shaft so as to act as a thrust bearing between the screw shaft and power shaft when the coupling slips by reason of overloading.

Means are provided for increasing the compression of the coupling members 5, 7 so as to cause them to transmit normal cranking loads without slipping. As shown in Fig. 1, this means comprises a plurality of comparatively stiff and heavy compression springs 15$^a$ located similarly to the light springs 15, but being shorter than springs 15 so that there is normally a space 30 between the ends of springs 15$^a$ and the driving coupling member 7, which space is slightly less than the longitudinal travel of the screw shaft 4 on the power shaft 2. By this arrangement the coupling member 7 encounters the heavy springs 15$^a$ just before the longitudinal movement of the screw shaft is arrested by the thrust bearing 29, and slippage of the coupling 7, 5 thereafter is resisted by the compressive action of the heavy springs.

Figure 2:
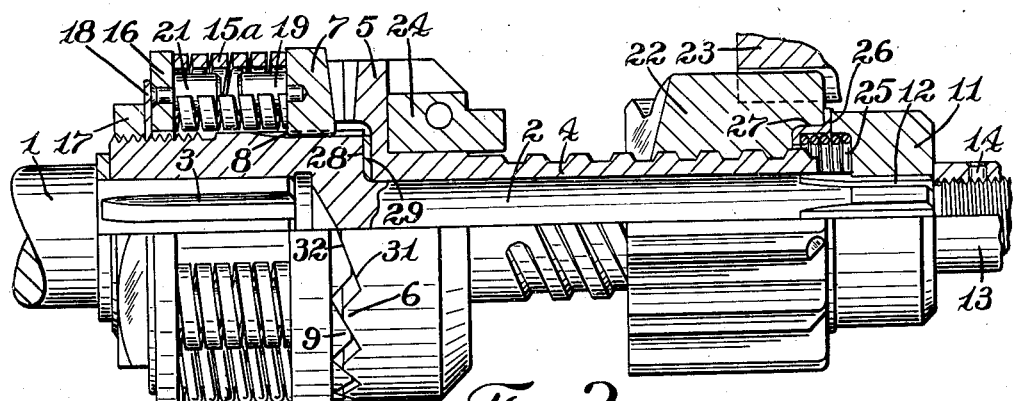
Fig. 2 is a similar view showing the parts in cranking position.
Figure 3:
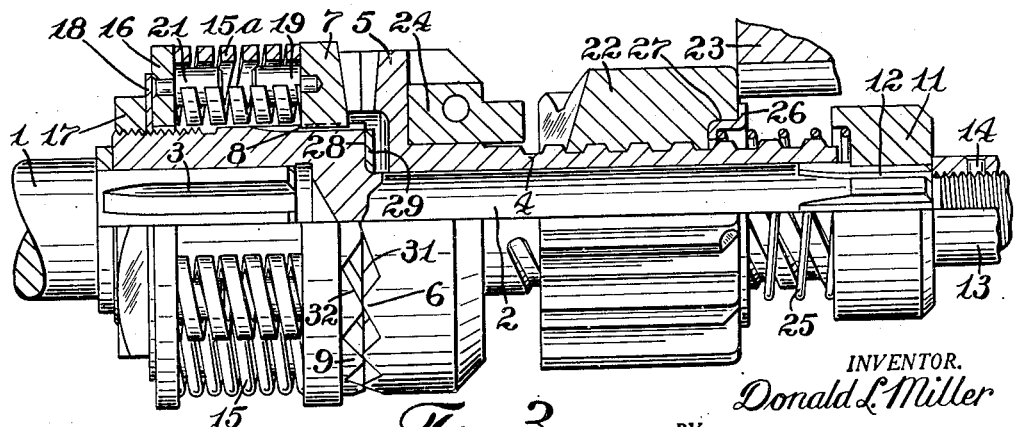
Fig. 3 is a similar view showing the parts in the positions assumed in case of tooth abutment between the pinion and ring gear.

In operation, starting with the parts in the positions illustrated in Fig. 1, rotation of the motor shaft 1 in the direction of the arrow imparts rotation to the power shaft 2, which rotation is transmitted through coupling members 7, 5 to the screw shaft 4. This causes the pinion 22 to be translated to the right into engagement with the ring gear 23 as shown in Fig. 2. It will be understood that the springs 15 are normally held under slight compression by the adjusting nut 17 so that the coupling members 7 and 5 are pressed together with a comparatively light pressure. If, therefore, the teeth of the pinion 22 should abut against the teeth of the ring gear 23 in the meshing operation as shown in Fig. 3, the springs will yield to cushion the impact, and will permit the coupling members to have relative movement to assist in indexing the pinion teeth into proper registry with the tooth spaces of the ring gear.

If this relative movement is sufficient to cause the teeth 9 of the driving coupling member 7 to ratchet over the teeth 6 of the driven coupling member 5, the momentary release of the longitudinal pressure of the pinion teeth against the teeth of the engine gear, and the vibration caused by the ratcheting action, assist in relieving the abutting condition and indexing the pinion teeth into proper registry with the tooth spaces of the engine gear. When the pinion is thus properly indexed, the expansion of the springs 15 snaps the pinion into initial engagement with the ring gear so as to prevent milling of the gear teeth.

Further rotation of the power shaft 2 after the pinion has engaged the ring gear of the engine causes the screw shaft 4 to be moved to the left by the screw-jack action of the screw shaft and nut, until the driving coupling member 7 engages the heavy springs 15$^a$, which thereupon resist further movement of said coupling member, thus increasing the torque capacity of the coupling. Further longitudinal movement of the screw shaft to the left is limited by the thrust bearing 29, which accordingly limits the compression and the torque capacity of the coupling 7, 5. It will be understood that the inclination of the sides 31 and 32 of the coupling teeth 6, 9 respectively which are in driving engagement, is so chosen in connection with the stiffness of the springs 15 and 15$^a$ that the rotary component of the pressure between the teeth will transmit the normal cranking torque when the screw shaft is in engagement with the thrust bearing 29 as illustrated in Fig. 2. When the normal cranking torque is exceeded, either during the initial acceleration of the engine by the starting motor or thereafter by a backfire condition of the engine, the additional load causes the coupling teeth 9 to ratchet over the coupling teeth 6 until the excessive load condition ceases, whereupon the normal transmission of torque is resumed.

When the engine starts, the acceleration of the ring gear 23 causes the pinion 22 to shift itself back to idle position on the screw shaft 4 where it is retained by the anti-drift spring 25.

Although certain structure has been illustrated and described in detail, it will be understood that changes may be made in the precise details of the parts without departing from the spirit of the invention.

I claim:

1. In an engine starter drive a power shaft, a driving coupling member splined thereon having inclined teeth, a screw shaft slidably journalled on the power shaft having a driven coupling member with inclined teeth adapted to cooperate with the teeth of the driving coupling member, an abutment member on the power shaft defining the normal position of the screw shaft thereon, spring means on the power shaft pressing the driving coupling member against the driven coupling member, and a pinion threaded on the screw shaft for longitudinal movement into and out of mesh with a gear of an engine to be started, said abutment member being arranged to arrest the meshing movement of the pinion.

2. An engine starter drive as set forth in claim 1 in which said power shaft is provided with a shoulder limiting longitudinal movement of the screw shaft away from the engine gear.

3. An engine starter drive as set forth in claim 1 including further, means for adjusting the spring means so as to prevent slippage of the coupling members under normal cranking load, said spring means being arranged to permit the coupling members to ratchet over each other when the drive is overloaded.

4. In an engine starter drive, a power shaft, a screw shaft slidably journalled thereon, a pinion threaded on the screw shaft for longitudinal movement into and out of mesh with a gear of an engine to be started, means including a yielding ratchet coupling for rotating the screw shaft from the power shaft, means for arresting the longitudinal movement of the pinion, means whereby the screw-jack action of the screw shaft and pinion, after the longitudinal movement of the pinion is arrested, compresses the ratchet coupling to increase its torque capacity; and means for limiting the compression of the coupling to cause it to slip on overload.

DONALD L. MILLER.

REFERENCES CITED

The following references are of record in the file of this patent:

UNITED STATES PATENTS

| Number | Name | Date |
| --- | --- | --- |
| 2,450,129 | Gleasman | Sept. 28, 1948 |